United States Patent [19]
Nishioka

[11] Patent Number: 6,042,403
[45] Date of Patent: Mar. 28, 2000

[54] CONNECTOR DEVICE FOR IC CARD

[75] Inventor: Toru Nishioka, Miyagi-ken, Japan

[73] Assignee: Alps Electric Co, Ltd., Tokyo, Japan

[21] Appl. No.: 09/121,572

[22] Filed: Jul. 23, 1998

[30] Foreign Application Priority Data

Jul. 29, 1997 [JP] Japan .................................. 9-203062
Jul. 1, 1998 [JP] Japan .................................. 10-001673

[51] Int. Cl.[7] .................................................. H01R 13/62

[52] U.S. Cl. ............................................................ 439/159

[58] Field of Search ................................. 439/159, 160, 439/155, 152, 157

[56] References Cited

U.S. PATENT DOCUMENTS 5,499,925  3/1996  Lwee ........................................ 439/157

*Primary Examiner*—Paula Bradley
*Assistant Examiner*—Tho Dac Ta
*Attorney, Agent, or Firm*—Brinks Hofer Gilson & Lione

[57] ABSTRACT

In an outside surface of a frame having a guide groove for draw and insert of an IC card in an inside, a heart-shaped cam groove that can hold a push rod at two positions, that is, a pushed-in position and a projecting position with cooperating with a first transfer pin, and a circulative cam groove and a linear long groove which a second transfer pin selectively traces according to the projection amount of the push rod are formed, and this second transfer pin is intervened between the first transfer pin and a drive plate interlocking with an eject arm.

11 Claims, 9 Drawing Sheets

FIRST PROJECTING POSITION ———
SECOND PROJECTING POSITION — — —

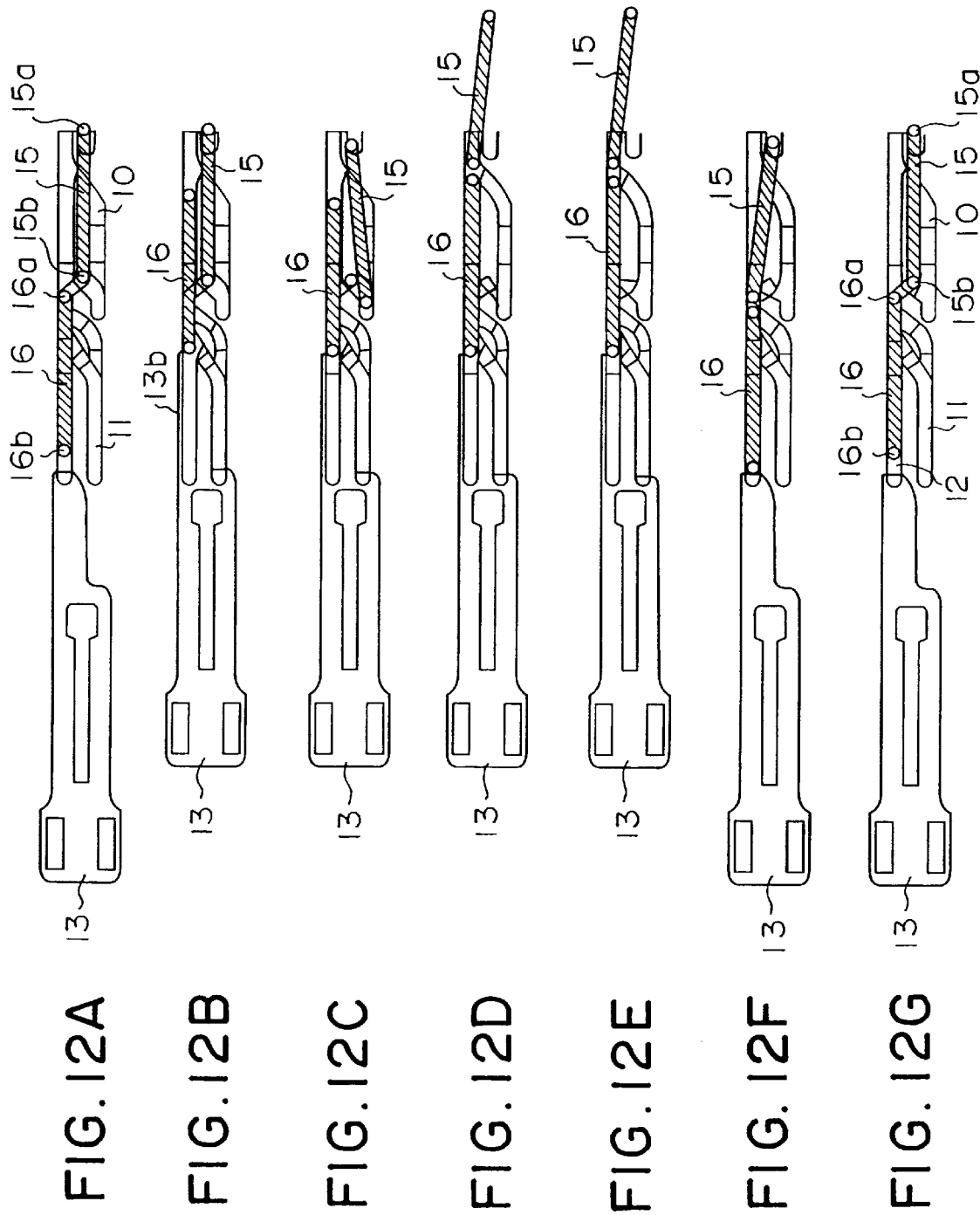

CONNECTOR DEVICE FOR IC CARD

BACKGROUND OF THE INVENTION

1. Field of the Invention

The present invention relates to a connector device provided in equipment used by drawing and inserting an IC card, and in particular, to an eject mechanism for discharging an IC card that is inserted.

2. Description of the Related Art

Usually, connector devices each are schematically constructed with a pin header section where multiple pin contacts for connecting to socket contacts in an IC card are located in a pin housing, a frame guiding the IC card at the time of draw and insert, an eject mechanism for discharging from the pin contacts the IC card that is inserted, and the like, and connector devices where a pin housing and a frame are molded in one piece are also well-known.

Hitherto, the connector devices for IC cards widely adopted are those that each are constructed with a push rod that is held on the external side of the frame so that reciprocation motion along the direction of drawing and inserting the IC card can be performed, and an eject bar rotatably supported on the frame or the pin housing, and in which an end of the eject lever is engaged with the push rod. A connector device for an IC card providing such an eject mechanism has a disadvantage that, if the push rod is pushed in when the IC card is inserted, the IC card can be easily drawn with fingers by a hook section of the eject lever, rotating with interlocking with this push rod, pushing the IC card to the near side. However, since the push rod projects to the near side, the push rod is erroneously operated against user's intention during the time of connecting the IC card.

Against this, a connector device for an IC card disclosed in Japanese Unexamined Utility Model Publication No. 6-13072 comprises first and second transfer levers performing link connection between a push rod and a slide plate, a third transfer lever attachable to and detachable from the second transfer lever pivoted by the first transfer lever, and a heart-shaped cam mechanism that can hold the push rod at pushed-in and projecting positions, and is constructed so that a pushing force may be selectively transferred to the slide plate according to a projection amount of the push rod. Thus, in inserting the IC card, although the push rod is held at the pushed-in position and the third transfer lever does not engage with the second transfer lever, if the push rod is further pulled to a second projecting position in the near side after projecting the push rod by a first projecting position by the heart-shaped cam mechanism, the third transfer lever engages with the second transfer lever at the second projecting position. Hence, if the push rod is pressed toward the pushed-in position in this state, the pushing force is transferred to the slide plate through each transfer lever, and the slide plate pushes the IC card to the near side. Therefore, it is possible to prevent discharging of the IC card against user's intention by the push rod being held at the pushed-in position when the IC card is inserted and being projected to the second projecting position only when the IC card is discharged.

In this manner, according to the connector device for an IC card disclosed in the above-mentioned publication, since the push rod can be held at the pushed-in position during the time of connecting the IC card and the push rod is projected only when the IC card is discharged, it is possible to prevent discharging of the IC card against user's intention. Further, if a user mistakenly makes the push rod project in spite of a user not wishing discharging of the IC card, the push rod can be held again at the pushed-in position without discharging of the IC card. Hence, it is possible to increase operability of eject operation.

However, this has a problem that, since three times of operation, that is, operation of projecting a push rod, which is held at a pushed-in position, to a first projecting position, operation of pulling out the push rod, which is at the first projecting position, to a second projecting position, and operation of pushing the push rod, which is projected to the second projecting position, to the pushed-in position are necessary at the time of usual eject operation, the eject operation is complicated. In addition, this leaves a problem that, if the push rod is mistakenly projected to the second projecting position, the IC card is discharged against user's intention. Furthermore, this has an additional problem that, since three transfer levers link-joined are provided between the push rod and a slide plate, and a pushing force of the push rod is transferred to the slide plate or is shut off according to a posture of each transfer lever, a wide space for rotating each transfer lever is necessary, and hence, miniaturization of the connector device for an IC card is disturbed. In addition, there arises another problem that, owing to these reasons, each transfer lever has to be located inevitably in the ceiling side or bottom side of an IC card inlet, especially, in case of a connector device for IC cards that can accept two or more IC cards, a plurality of respective transfer levers has to be stacked vertically with securing a sufficient space, and hence, the connector device for an IC card becomes large also in the height direction.

SUMMARY OF THE INVENTION

A connector device for an IC card according to the present invention has a frame, insertably supporting an IC card, and a push rod capable of reciprocation between a pushed-in position and a projecting position, the connector device for an IC card where the push rod is at the pushed-in position during the time of inserting the IC card, the push rod moves to a first projecting position by a first push operation of the push rod in this state, and the IC card is discharged by a second push operation of the push rod at this first projecting position, wherein the push rod can be moved from the first projecting position to the second projecting position that projects more than the first projecting position, the push rod is moved to the second projecting position with performing the pull operation of the push rod at the time when the push rod is at the first projecting position, and discharging of the IC card is canceled when the push rod is pushed at the second projecting position.

In addition, a connector device for an IC card according to the present invention comprises first and second transfer pins, and a drive plate that can reciprocate, and is constructed so that the push rod may be held at the pushed-in position with the first transfer pin and discharging and discharge-canceling of the IC card may be performed by cooperation of the first and second transfer pins, and the drive plate.

Furthermore, a connector device for an IC card according to the present invention is constructed so that not only the first transfer pin may face the second transfer pin but also the second transfer pin may face the drive plate when the push rod is at the first projecting position, not only the first transfer pin moves the second transfer pin but also the second transfer pin moves the drive plate if the push rod is moved to the pushed-in position with push operation in the state of the push rod being at this first projecting position, and the IC card is discharged, and further, the facing state between the second transfer pin and the drive plate is canceled when the push rod is pushed after the push rod is moved from the first projecting position to the second projecting position, movement of the drive plate due to movement of the transfer pin is not performed, and then, the discharging of the IC card is canceled.

Moreover, a connector device for an IC card according to the present invention has a circulative cam groove and is constructed so that the second transfer pin may trace the circulative cam groove in one direction, wherein facing of the second transfer pin to the drive plate is canceled by the circulative cam groove when the push operation is performed to the push rod at the second projecting position.

In addition, a connector device for an IC card according to the present invention comprises a heart-shaped cam groove connected to the circulative cam groove, and a linear long groove connected to the circulative cam groove, wherein the first transfer pin traces the inside of the heart-shaped cam groove in one direction, the drive plate is located inside the linear long groove, and the first transfer pin projects into a moving area of the second transfer pin.

Furthermore, the first and second transfer pins are constructed in U-shaped material having an upper section and folded sections formed at both ends of the upper section, first and second projecting sections are provided in the push rod, and the upper section of the first transfer pin is made to contact to the first projecting section and the upper section of the second transfer pin is to the second projecting section. Further, one end of one side of the folded section of the first transfer pin is engaged with the heart-shaped cam groove and one end of one side of the folded section of the second transfer pin is engaged with the circulative cam groove. Furthermore, the first and second transfer pins are elastically pressed between the folded section of the first transfer pin and the first projecting section, and between the folded section of the second transfer pin and the second projecting section.

Moreover, the first and second transfer pins which are U-shaped have the folded sections that are formed both ends of the upper sections and are formed at the same length.

In addition, a mounting plate mounted on the frame is provided, and using the mounting plate, the push rod and the first and second transfer pins are mounted.

Furthermore, an elastic member that is cut and raised is provided in the mounting plate, and the elastic member elastically presses the first and second transfer pins.

Moreover, a plurality of IC cards is insertably held in the vertical direction inside the frame, and a plurality of push rods is provided in the vertical direction outside the frame.

Still, a mounting plate mounted on the frame is provided, and the plurality of push rods, and the first and second transfer pins provided with corresponding to the plurality of push rods are mounted with the mounting plate.

Still more, an elastic member that is cut and raised is provided in the mounting plate, the first and second transfer pins provided with corresponding to the plurality of push rods are elastically pressed by the elastic members.

The present invention has advantages as described below.

In case of discharging an inserted IC card, by moving a push rod to a pushed-in position at a first projecting position after pushing the push rod at the pushed-in position and projecting the push rod to the first projecting position, usual eject operation can be performed, and in case of a user mistakenly projecting the push rod in spite of the user not wishing discharging of the IC card, if the push rod is pushed to a pushed-in direction at this first projecting position after pulling the push rod and projecting the push rod from the first projecting position to the second projecting position that is in a further near side, discharging of the IC card is canceled and an insertion state is kept, and hence, it is possible to realize an eject mechanism having excellent operability, and in particular, it is appropriate to apply this mechanism to a connector device for IC cards that can accept a plurality of IC cards.

BRIEF DESCRIPTION OF THE DRAWINGS

FIGS. 12A–12G is an explanatory diagram showing usual eject operation; and

DESCRIPTION OF THE PREFERRED EMBODIMENT

Figure 1:
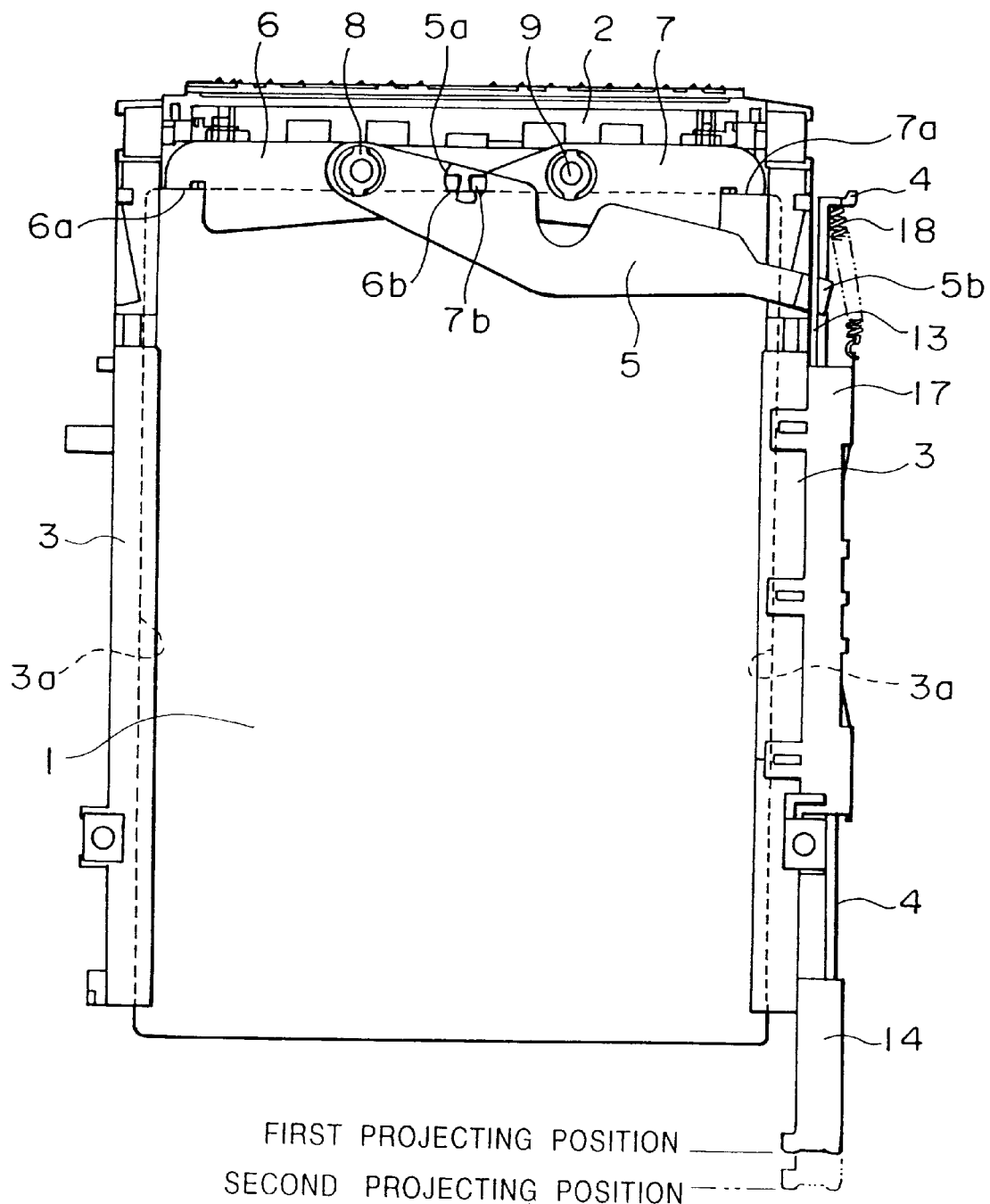
FIG. 1 is a top view showing a state of inserting an IC card into a connector device for an IC card according to an embodiment of the present invention.
Figure 2:
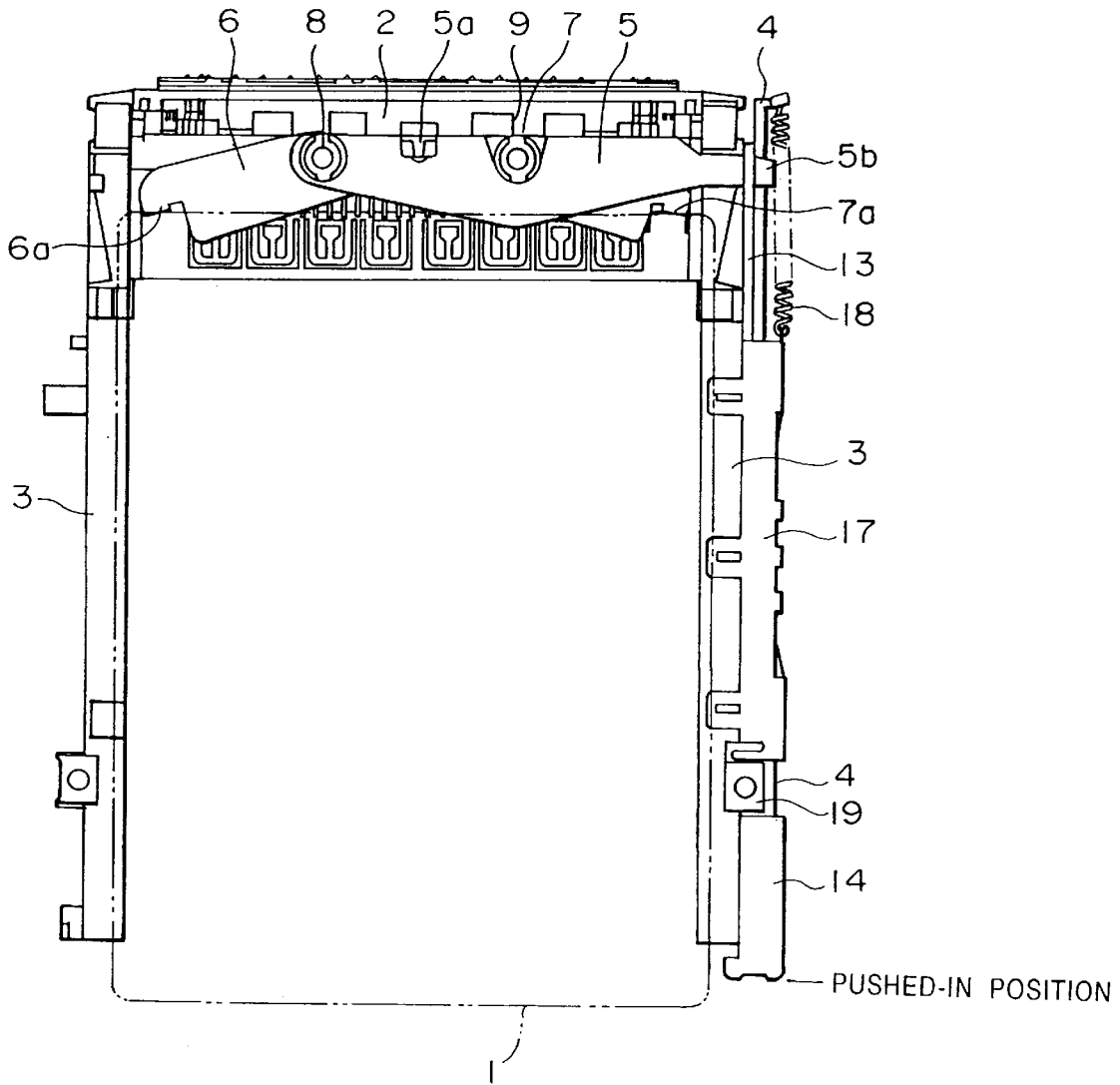
FIG. 2 is a top view showing a state of being just after detaching an IC card from the connector device.
Figure 3:
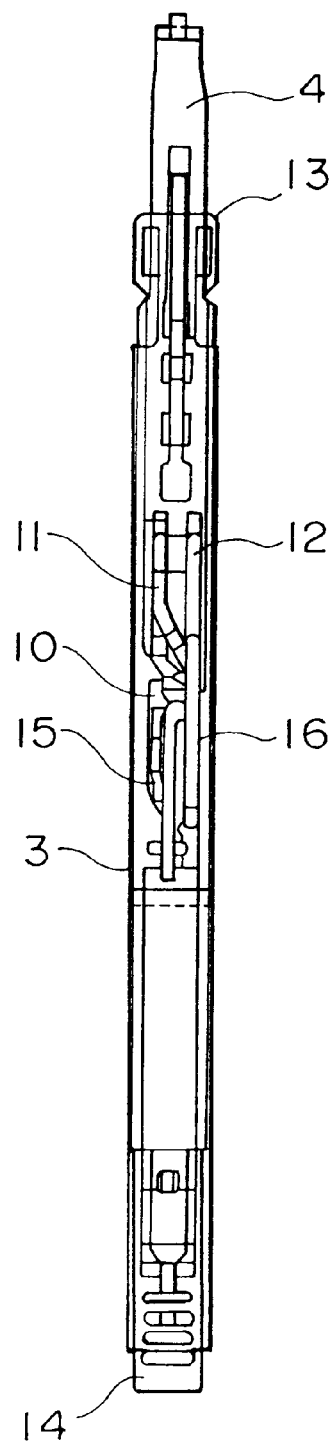
FIG. 3 is a side view of a main part of an eject mechanism provided in the connector device.
Figure 4:
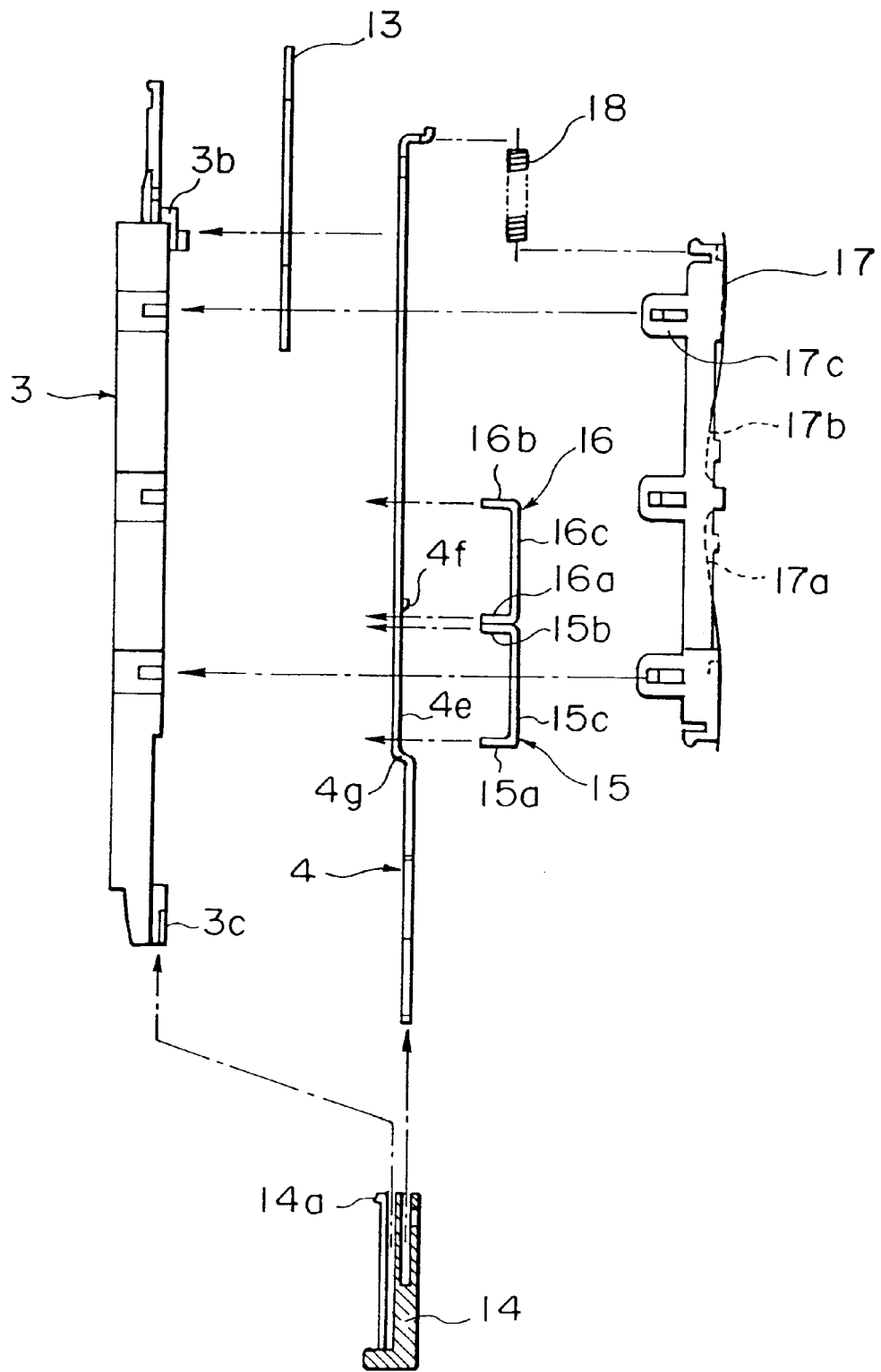
FIG. 4 is an exploded diagram of the eject mechanism.
Figure 5:
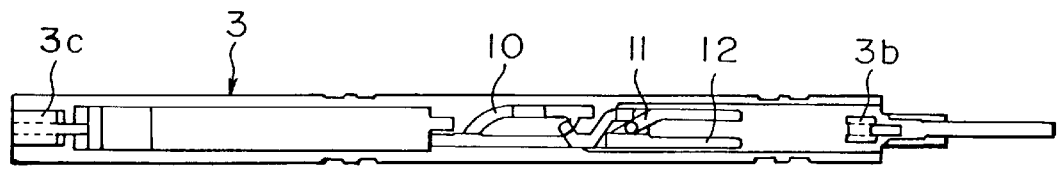
FIG. 5 is a side view of a frame.
Figure 6:
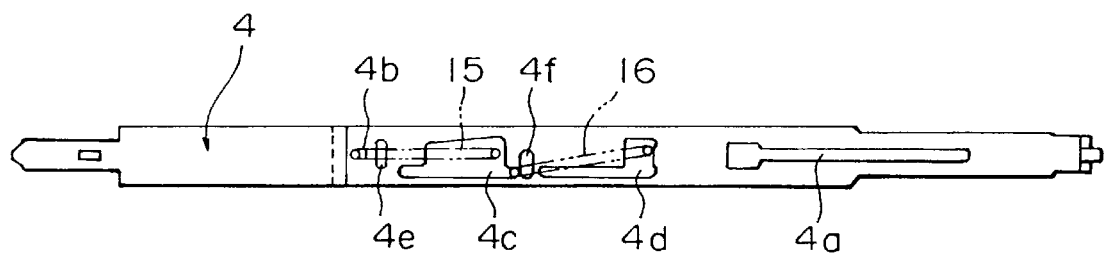
FIG. 6 is a side view of a push rod.
Figure 7:
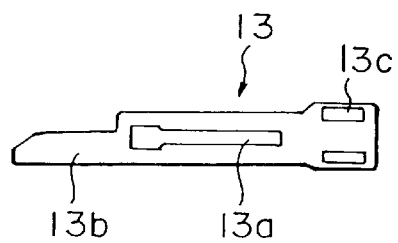
FIG. 7 is a side view of a drive plate.
Figure 8:
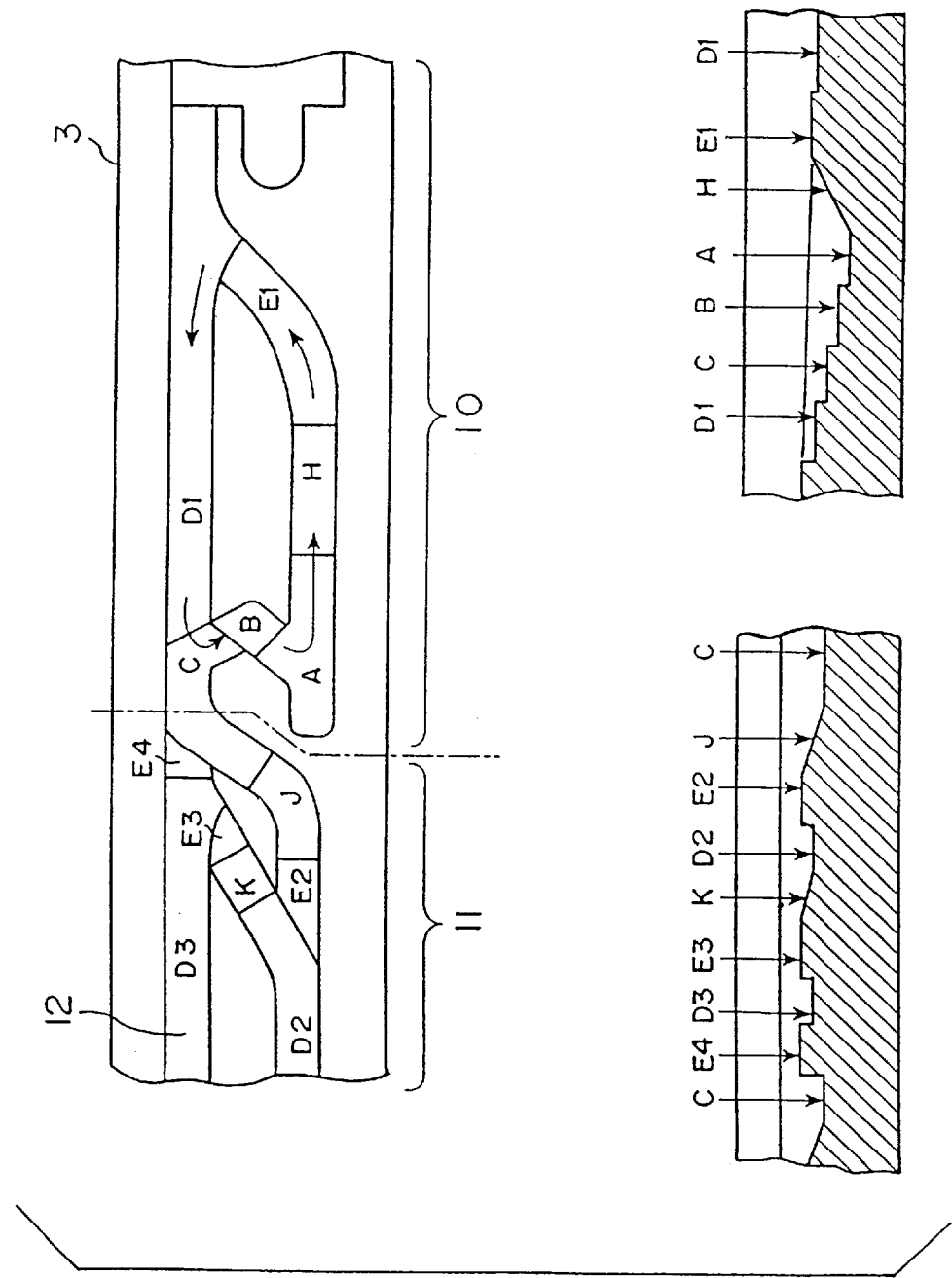
FIG. 8 is an explanatory diagram of a heart-shaped cam groove and a circulative cam groove.
Figure 9:
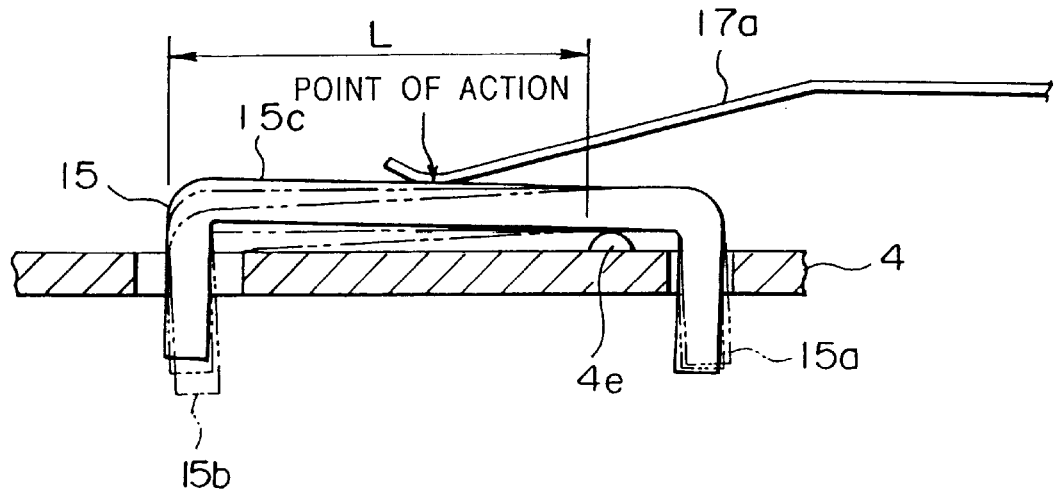
FIG. 9 is an explanatory diagram showing an elastically pressing state by a first transfer pin.
Figure 10:
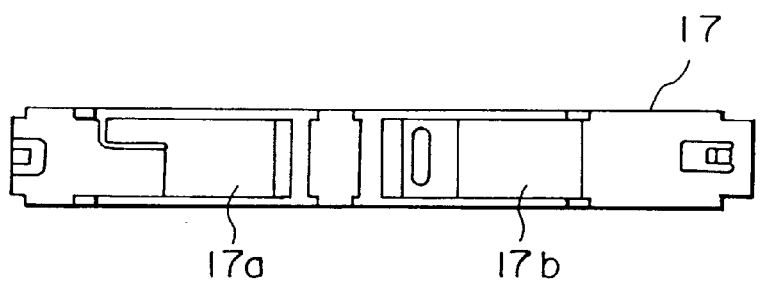
FIG. 10 is a side view of a mounting plate.
Figure 11:
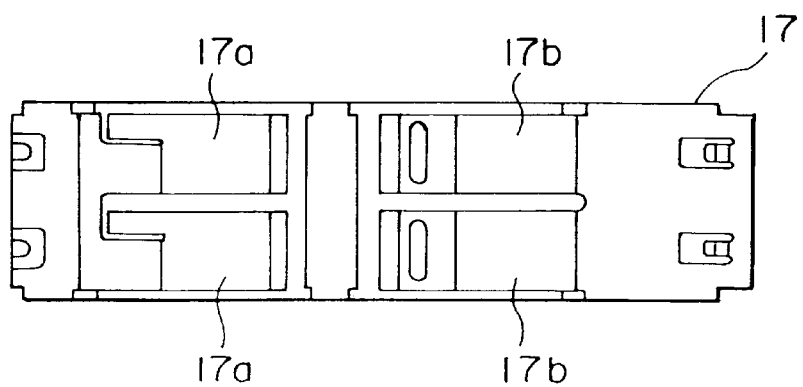
FIG. 11 is a side view of a mounting plate.

With an embodiment being described with reference to drawings, FIG. 1 is a top view showing a state of inserting an IC card into a connector device for an IC card according to an embodiment, FIG. 2 is a top view showing a state of being just after the IC card is detached from the connector device, FIG. 3 is a side view of a main part of an eject mechanism provided in the connector device, FIG. 4 is an exploded diagram of the eject mechanism, FIG. 5 is a side view of a frame, FIG. 6 is a side view of a push rod, FIG. 7 is a side view of a drive plate, FIG. 8 is an explanatory diagram of a heart-shaped cam groove and a circulative cam groove, FIG. 9 is an explanatory diagram showing an elastically pressing state by a first transfer pin, FIGS. 10 and 11 are side views of a mounting plate, FIG. 12 is an explanatory diagram showing usual eject operation, and FIG. 13 is an explanatory diagram showing cancel operation.

As shown in FIGS. 1 and 2, the connector device for IC cards according to the embodiment are mainly composed of: a pin housing 2 press-fitting and fixing multiple pin contacts for connecting to socket contacts (any of them are not shown) in the IC card 1, in predetermined arrangement; a pair of frames 3 that is fixed on left and right sides of the housing 2 and guides the IC card from both sides in the cross direction; a push rod 4 attached to one of frames 3; and an eject arm 5, first and second rotation arm 6 and 7 that are pivoted by the pin housing 2, an eject mechanism which is provided between the push rod 4 and the eject arm 5 and will be described later.

In the pin housing 2, a first spindle 8 and a second spindle 9 are provided at a predetermined gap, and an end of the eject arm 5 is rotatably supported by the first spindle 8. In this eject arm, a communication hole 5a and an engaging section 5b are formed, and the engaging section 5b projects to the outside of the frame 3. The first rotation arm 6 is also rotatably supported by the spindle 8, and a catch piece 6a for pushing out the IC card and a tongue piece 6b projecting inside the communication hole 5a of the eject arm 5 are formed. The second rotation arm 7 is rotatably supported by the second spindle 9, and a catch piece 7a for pushing out the IC card and a tongue piece 7b projecting inside the communication hole 5a of the eject arm 5 are formed.

With construction of the eject mechanism being described in detail with reference to FIGS. 3 to 11, although the connector device for an IC card shown in the embodiment can accept two IC cards 1 along guide grooves 3a that have two step construction, that is, an upper step and a lower step and are formed on inside surfaces of both frames 3, and comprises two push rods 4, discharging both IC cards, on the outside of one of frames 3, functions and construction of both push rods 4 are fundamentally the same, and hence, one side of push rod 4 and its eject mechanism will be described below (FIG. 3 also shows only one side of push rod and eject mechanism, and another side is omitted).

As shown in FIG. 5, a pair of guide projecting sections 3b and 3c is provided on the outside surfaces of the frame 3, a heart-shaped cam groove 10, and a circulative cam groove 11, and a linear long groove 12 are engraved between these guide projecting sections 3b and 3c. As shown in FIG. 8, these heart-shaped cam groove and circulative cam groove have a plurality of cam surfaces whose heights are different from each other, and both cam grooves 10 and 11 are continued in a cam surface C. A cam surface D3 of the linear long groove 12 is formed between a cam surface E3 and a cam surface E4 of the circulative cam groove 11, and this cam surface D3 is positioned on an extension line of the cam surface D1 of the heart-shaped cam groove 10.

A drive plate 13 is held on an outside surface of the frame 3 so that the drive plate 13 can perform reciprocating motion, and, as shown in FIG. 7, this drive plate 13 has a guide hole 13a into which one of guide projecting sections 3b is inserted. In addition, a narrow receiving section 13b is formed in the drive plate 13, and this receiving section 13b performs reciprocating motion just over the linear long groove 12. Further, an engaging hole 13c is provided in the drive plate 13, and the engaging section 5b of the eject arm 5 engages with the engaging hole 13c of the drive plate 13 with passing through the frame 3.

The push rod 4 is assembled from above the drive plate 13 on the outside surface of the frame 3, and this push rod 4 is held by both guide projecting sections 3b and 3c so that the push rod 4 can reciprocate along the draw and insert directions of the IC card. A handle 14 is attached at an end of the push rod 4, and a guide projecting section 3c and a detachable catch 14a are formed under this handle 14. As shown in FIG. 6, a guide hole 4a is provided in the push rod 4, and the guide projecting section 3b of the frame 3 is inserted into this guide hole 4a. In addition, a shaft hole 4b and first and second relief holes 4c and 4d are provided in the push rod 4, and projecting sections 4e and 4f are formed between the shaft hole 4b and the first relief hole 4c, and between both relief holes 4c and 4d.

The first transfer pin 15 and the second transfer pin 16 are held on the outside surface of the push rod 4. The first transfer pin 15 has U-shaped construction obtained by folding a pair of arm sections 15a and 15b at both ends of the upper section 15c, and lengths of both arm sections are set to be the same. One arm section 15a is inserted into the shaft hole 4b of the push rod 4, the other arm section 15b engages with each cam surface of the heart-shaped cam groove with passing through the first relief hole 4c, and the first transfer pin 15 can swing with the shaft hole 4b as a supporting point. The second transfer pin 16 also has U-shaped construction obtained by folding a pair of arm sections 16a and 16b at both ends of the upper section 16c, and lengths of both arm sections are set to be the same. One arm section 16a engages with the cam surface D1 of the heart-shaped cam groove 10 with passing through the first relief hole 4c of the push rod 4, the other arm section 16b selectively engages with any one of each cam surface of the circulative cam groove 11 and the linear long groove 12 with passing through the second relief hole 4d, and the second transfer pin 16 can swing within both relief holes 4c and 4d. In that time, by the upper section 15c of the first transfer pin 15 and the upper section 16c of the second transfer pin 16 swinging above the projecting sections 4e and 4f respectively, frictional resistance between the push rod 4 and both transfer pins 15 and 16 becomes small. In addition, since both arm sections 15a and 15b of the first transfer pin 15 are formed at the same length and both arm sections 16a and 16b of the first transfer pin 16 are also formed at the same length, assembly workability becomes easy because there is no directional condition when the first transfer pin 15 and the second transfer pin 16 are assembled in the push rod 4.

A mounting plate 17 is mounted from above the push rod 4 on the outside surface of the frame 3, and the push rod 4 and the first and second transfer pins 15 and 16 are mounted with this mounting plate 17 lest they should drop from the frame 3. A pair of elastic pieces 17a and 17b are formed with being cut and raised in the mounting plate 17, a plurality of mounting legs is also formed with being folded, and each mounting leg 17c is fixed to the frame 3 by means of snap coupling. As shown in FIG. 9, one of the elastic pieces 17a elastically contacts with the upper section 15c of the first transfer pin 15, and the first transfer pin 15 is elastically pressed toward the outside surface of the frame 3 by this elastic piece 17a. In that time, since a point of action of the elastic piece 17a is set between the projecting section 4e and the arm section 15b, that is, within the range shown by an arrow L in FIG. 9, the arm section 15b of the first transfer pin 15 is pressed toward the cam surfaces of the heart-shaped cam groove with the projecting section 4e as a supporting point, and in consequence, the arm section 15b can securely trace each cam surface. Another elastic piece 17b of the mounting plate 17 elastically contacts with the upper section 16c of the second transfer pin 16, the second transfer pin 16 is elastically pressed toward the outside surface of the frame 3 by this elastic piece 17b. Although illustration is omitted, since a point of action of the elastic piece 17b is also set between the projecting section 4f and the arm section 16b, the arm section 16b can securely trace each cam surface and the linear long groove 12.

The number of the elastic pieces 17a and 17b are increased or decreased according to the number of steps of the guide groove 3a formed in the frame 3, for example, in case of a frame 3 having a step according to an IC card 1, as shown in FIG. 10, a pair of elastic pieces 17a and 17b is formed in a mounting plate 17. In case of a frame 3 having two steps according to two IC cards, as shown in FIG. 11, two pieces/mounting plate, that is, total four elastic pieces 17a and 17b are formed. Further, in case of a frame 3 having tree or more steps, the number of elastic pieces is similar to the above. In this manner, although cost reduction can be performed by reducing the number of parts through forming the elastic pieces 17a and 17b in a mounting plate 17 in one piece, it is also appropriate to form the elastic pieces 17a and 17b in separate mounting plates 17 by dividing the mounting plate 17 into two pieces. In addition, since a coil spring 18 is stretched between the mounting plate 17 and the push rod 4, and the push rod 4 is pulled toward the projecting direction from the front of the frame 3 by this coil spring 18.

With interlocking with the pushing operation of the push rod 4, the arm section 15b of the first transfer pin 15 traces each cam surface of the heart-shaped cam groove 10 in the directions shown by arrows in FIG. 8. When the arm section 15b engages with the cam surface B, the push rod 4 is held at the pushed-in position shown in FIG. 2, the arm section 15b moves from the cam surface E1 to the cam surface D1. Further, when the engaging catch 14a of the handle 14 engages with the guide projecting section 3c of the frame 3, the push rod 4 is held at the first projecting position shown in FIG. 1. In addition, against an engaging force between the engaging catch 14a of the handle 14 and the guide projecting section 3c, the push rod 4 can be moved from the first projecting position to the second projecting position that is in a nearer side, and the folded section 4g of the push rod 4 contacts to the mounting bracket 19 fixed to the frame 3 at the second projecting position.

In the connector device for an IC card that is constructed like this, first, a normal operation mode in which an IC card 1 is discharged after insertion of the IC card 1 will be described mainly with reference to FIG. 12. First, if the IC card 1 is not inserted, the push rod 4 is held at the pushed-in position in FIG. 2. In this time, as shown in FIG. 12A, the arm section 15b of the first transfer pin 15 engages with the cam surface B of the heart-shaped cam groove 10, the push rod 4 is stably held at the pushed-in position by the tensile force of the coil spring 18 and the first transfer pin 15 engaging with the cam surface B.

As the IC card 1 is inserted along the guide groove 3a of the frame 3, the IC card 1 moving to the pin housing 2 is pressing pin contacts of the pin housing 2 into its own socket contacts as the IC card 1 presses the catch pieces 6a and 7a of the first and second rotation arms 6 and 7. Hence, the IC card 1 becomes in a complete insertion state in which the IC card surely contacts to respective pin contacts by inserting the IC card by a predetermined amount. In that time, the first rotation arm 6 and second rotation arm 7 rotate in mutually reverse directions with using the first spindle 8 and second spindle 9 as rotation shafts, and rotation of these rotation arms 6 and 7 is transferred to the eject arm 5 via a link portion of the tongue piece 6b and 7b and the communication hole 5a. Hence, the eject arm 5 rotates about the first spindle 8 as a rotation shaft, and the drive plate 13 moves to the front of the frame 3 with interlocking with that. Owing to this, as shown in FIG. 12B, one arm section 16b of the second transfer pin 16 moves in the linear long groove 12 and another arm section 16a moves in the cam surface D1 of the heart-shaped cam groove 10 respectively because of being pressed by the receiving section 13a of the drive plate 13. However, the arm section 15b of the first transfer pin 15 engages with the cam surface B of the heart-shaped cam groove 10. Hence, the arm section 16a of the second transfer pin 16 does not contact to the arm section 15b of the first transfer pin 15. Therefore, it is kept for the push rod 4 to be held at the pushed-in position during the IC card 1 being inserted.

In order to discharge the IC card 1 from this state, first, the push rod 4 held at the pushed-in position is pushed forward, and as shown in FIG. 1, the handle 14 of the push rod 4 is projected to the first projecting position. In this case, if the push rod 4 held at pushed-in position is pushed, as shown in FIG. 12C, the arm section 15b of the first transfer pin 15 moves from the cam surface B of the heart-shaped cam groove 10 to the cam surface A and moves from the cam surface A to the cam surface D1 through the cam surfaces H and E1, and hence, as shown in FIG. 12D, the arm section 16a of the second transfer pin 16 faces the arm section 15b of the first transfer pin 15 in the cam surface D1.

If the handle 14 of the push rod 4 is pushed to the pushed-in position after the push rod 4 is projected to the first projecting position in this manner, as shown in FIG. 12E, the arm section 15b of the first transfer pin 15 is engaged with the cam surface B of the heart-shaped cam groove from the cam surface D1 through the cam surface C, and hence, the push rod 4 is held at pushed-in position again. In that time, since the arm section 15b of the first transfer pin 15 contacts to and presses the arm section 16a of the second transfer pin 16 during the process in which the arm section 15b of the first transfer pin 15 moves from the cam surface D1, the arm section 16b of the second transfer pin 16 moves in the linear long groove 12 with pressing the receiving section 13b of the drive plate 13. In consequence, the eject arm 5 engaged by the drive plate 13 rotates, and the catch pieces 6a and 7a of the first and second rotation arms 6 and 7 press both ends of the front of the IC card 1 nearly to the discharged direction, as shown by a two-dot chain line in FIG. 2, and hence, the press fit of the socket contacts of the IC card 1 and the pin contacts of the pin housing 2 is released. Hence, it is possible to easily discharge the IC card 1 from the connector device by picking the front of the IC card 1 between fingers in this state and drawing it.

Figure 13A:
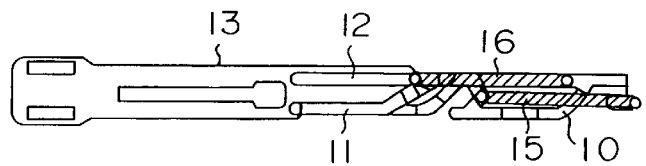
FIGS. 13A–13J is an explanatory diagram showing cancel operation.
Figure 13B:
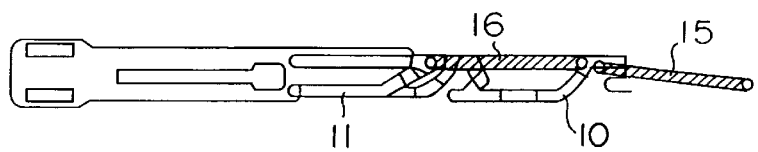

Next, a cancel mode in which the push rod 4 is returned to the pushed-in position without discharging the IC card 1 if the push rod 4 is mistakenly projected after the IC card 1 being inserted will be described mainly with reference to FIG. 13. Here, FIG. 13A shows a state of the push rod 4 being held at the pushed-in position after the IC card 1 being inserted, and in this state, if a user mistakenly pushes the push rod 4 forward in spite of the user not wishing discharging of the IC card 1, as mentioned above, the push rod 4 projects to the first projecting position, and as shown in FIG. 13B, the arm section 16a of the second transfer pin 16 faces the arm section 15b of the first transfer pin 15 in the cam surface D1.

Figure 13C:
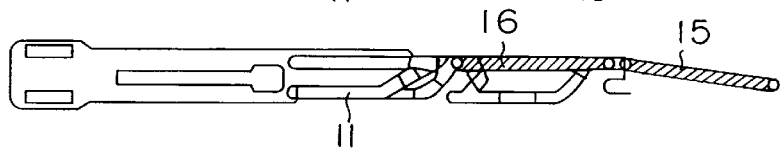
Figure 13D:
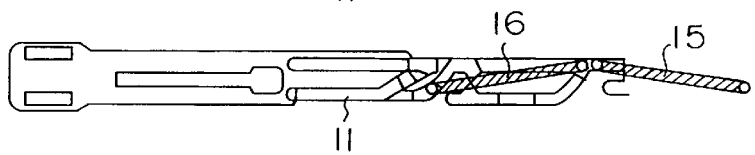
Figure 13E:
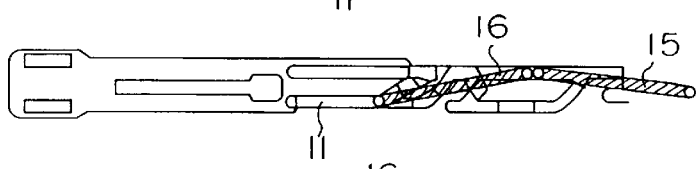
Figure 13F:
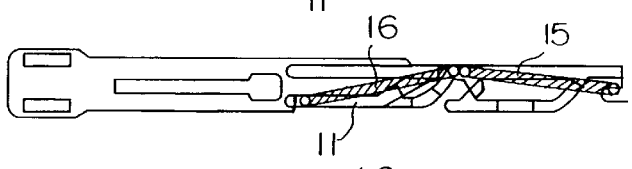
Figure 13G:
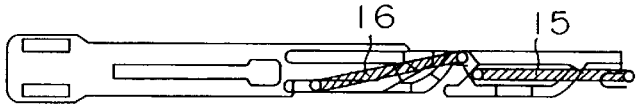

If the push rod 4 is projected to the second projecting position shown by a two-dot chain line in FIG. 1 by pulling the push rod 4 from the first projecting position to the further near side, as shown in FIG. 13C, the arm section 16b of the second transfer pin 16 moves from the linear long groove 12 to the cam surface C of the circulative cam groove through the cam surface E4. Then, the handle 14 of the push rod 4 is pushed to the pushed-in position, as shown in FIGS. 13D to 13G, the arm section 15b of the first transfer pin 15 is engaged with the cam surface B of the heart-shaped cam groove from the cam surface D1 through the cam surface C, and hence, the push rod 4 is held at the pushed-in position again. In that time, although the arm section 15b of the first transfer pin 15 contacts to and presses the arm section 16a of the second transfer pin 16, the arm section 16b of the second transfer pin 16 has already dropped in the cam surface C of the circulative cam groove 11 from the linear long groove 12, and hence, the arm section 16b moves from the cam surface C of the circulative cam groove 11 to the cam surface D2 through the cam surfaces J and E2. Therefore, since the second transfer pin 16 does not contact to the drive plate 13 and the eject arm 5 also does not rotate, the press-fit state of the socket contacts of the IC card 1 and the pin contacts of the pin housing 2 is kept.

Figure 13H:
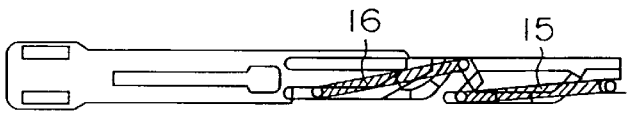
Figure 13I:
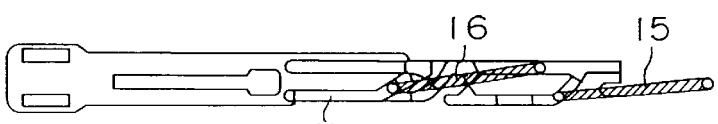
Figure 13J:
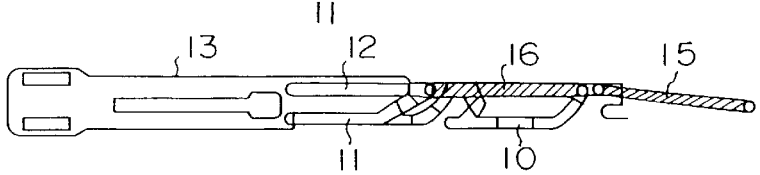

If the push rod 4 is pushed forward again at this pushed-in position after holding the push rod 4 from the second projecting position to the pushed-in position in this manner, the arm section 15b of the first transfer pin 15, as shown in FIGS. 13H to 13J, moves from the cam surface B of the heart-shaped cam groove 10 to the cam surface D1 through the cam surfaces A, H, and E1, and the arm section 16b of the second transfer pin 16 moves from the cam surface D2 of the circulative cam groove to the cam surface D3 of the linear long groove 12 through the cam surfaces K and E3. Thus, as shown in FIG. 13J, the arm section 16a of the second transfer pin 16 faces the arm section 15b of the first transfer pin 15 again, and this is the same state as that shown in FIG. 12D in a normal operation mode.

It is apparent from the above-mentioned description that, since a pushing force of the first transfer pin 15 is transferred to the drive plate 13 via the second transfer pin 16 tracing the inside of the linear long groove 12, the IC card 1 can be discharged. Against this, in case of a user mistakenly projecting the push rod 4 to the first projecting position in spite of the user not wishing discharging of the IC card 1, for example, in case of the user performing misoperation of another push rod 4 at the time when the user operates a push rod 4 of one of two eject mechanisms arranged in two steps, that is, upper and lower steps, if the push rod 4 is projected from the first projecting position to the second projecting position and is pushed to the pushed-in position, the pushing force of the first transfer pin 15 is transferred only to the second transfer pin 16 tracing the inside of the circulative cam groove 11, and the drive plate 13 is not moved by the second transfer pin 16, and hence, it is possible to keep the insertion state with canceling the discharging operation of the IC card 1.

In addition, in the above-mentioned embodiment, the connector device in which two IC cards can be inserted is exemplified and described, but the present invention can be similarly applied to a connector device in which one, three, or more IC card(s) can be inserted.

What is claimed is:

1. A connector device for an integrated circuit (IC) card comprising a frame for insertably supporting the IC card, and a push rod attached to said frame, said push rod capable of being set to a pushed-in position, a first projecting position and a second projecting position, said push rod being at the pushed-in position during the time of inserting the IC card and said push rod is moved to the first projecting position by a first push operation of said push rod, the IC card capable of being discharged by a second push operation of the push rod from said first projecting position, wherein said push rod is capable of being moved from the first projecting position to the second projecting position by pulling said push rod when said push rod is at the first projecting position, and wherein discharging of the IC card is canceled and an insertion state of the IC card is kept when said push rod is pushed to the pushed-in position from the second projecting position.

2. The connector device for an IC card according to claim 1, further comprising first and second transfer pins, and a drive plate that can reciprocate, wherein said push rod is held at the pushed-in position with said first transfer pin and discharging and discharge-canceling of the IC card is performed by cooperation of said first and second transfer pins, and said drive plate.

3. The connector device for an IC card according to claim 2, wherein a mounting plate is provided on said frame, and using the mounting plate, said push rod and said first and second transfer pins are mounted.

4. The connector device for an IC card according to claim 3, wherein an elastic member that is cut and raised is provided in said mounting plate, and said elastic member elastically presses said first and second transfer pins.

5. The connector device for an IC card according to claim 2, wherein said first transfer pin faces said second transfer pin and said second transfer pin faces said drive plate when said push rod is at the first projecting position, said first transfer pin moves said second transfer pin and said second transfer pin moves said drive plate if said push rod is moved to the pushed-in position with push operation in the state of said push rod being at this first projecting position, and the IC card is discharged, and, the facing state between said second transfer pin and said drive plate is canceled when said push rod is pushed after said push rod is moved from the first projecting position to the second projecting position, movement of said drive plate due to movement of said second transfer pin is not performed, and then, discharging of the IC card is canceled.

6. The connector device for an IC card according to claim 5, wherein a mounting plate is provided on said frame, and, said push rod and said first and second transfer pins are mounted using the mounting plate.

7. The connector device for an IC card according to claim 6, wherein an elastic member that is cut and raised is provided in said mounting plate, and said elastic member elastically presses said first and second transfer pins.

8. The connector device for an IC card according to claim 5, further comprising a circulative cam groove, wherein said second transfer pin traces said circulative cam groove in one direction, wherein facing of said second transfer pin to said drive plate is canceled by said circulative cam groove when the push operation is performed to said push rod at said second projecting position.

9. The connector device for an IC card according to claim 8, further comprising a heart-shaped cam groove connected to said circulative cam groove, and a linear long groove connected to said circulative cam groove, wherein said first transfer pin traces the inside of said heart-shaped cam groove in one direction, said drive plate is located inside said linear long groove, and said drive plate projects into a moving area of said second transfer pin.

10. The connector device for an IC card according to claim 9, wherein said first and second transfer pins each are constructed with a U-shaped material having an upper section and folded sections formed in both ends of the upper section, first and second projecting sections are provided in said push rod, the upper section of said first transfer pin is made to contact said first projecting section and the upper section of the second transfer pin is made to contract said second projecting section, one end of one side of the folded section of said first transfer pin is engaged with said heart-shaped cam groove and one end of one side of the folded section of said second transfer pin is engaged with said circulative cam groove, and said first and second transfer pins are elastically pressed between said folded section of said first transfer pin and said first projecting section, and between said folded section of said second transfer pin and said second projecting section.

11. The connector device for an IC card according to claim 10, wherein said first and second transfer pins that are U-shaped have said folded sections that are formed at the same length.

* * * * *